US011383219B2

(12) United States Patent
Monereau et al.

(10) Patent No.: US 11,383,219 B2
(45) Date of Patent: Jul. 12, 2022

(54) DEVICE MADE OF FABRIC FOR LIMITING OR PREVENTING THE MIGRATION OF PARTICLES BETWEEN TWO LAYERS (71) Applicant: L'Air Liquide, Société Anonyme pour l'Etude et l'Exploitation des Procédés Georges Claude, Paris (FR)

(72) Inventors: Christian Monereau, Montpellier (FR); Lian-Ming Sun, Villebon-sur-Yvette (FR); Bernard Fraioli, Draveil (FR); Benjamin Morineau, Kobe (JP); Vincent Gueret, Paris (FR); Eric Biret, Vitry sur Seine (FR); Chuan-Min Zhuo, Paris (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 17/259,428

(22) PCT Filed: Jun. 28, 2019

(86) PCT No.: PCT/FR2019/051612
§ 371 (c)(1),
(2) Date: Jan. 11, 2021

(87) PCT Pub. No.: WO2020/012088
PCT Pub. Date: Jan. 16, 2020

(65) Prior Publication Data
US 2021/0275988 A1 Sep. 9, 2021

(30) Foreign Application Priority Data
Jul. 11, 2018 (FR) ...................... 1856372

(51) Int. Cl.
B01J 8/00 (2006.01)
B01J 8/02 (2006.01)
B01J 8/04 (2006.01)
B01J 19/00 (2006.01)
B01J 19/24 (2006.01)
B01J 19/30 (2006.01)
B01J 19/32 (2006.01)

(52) U.S. Cl.
CPC .......... *B01J 19/305* (2013.01); *B01J 8/0453* (2013.01); *B01J 2208/00884* (2013.01)

(58) Field of Classification Search
CPC ....... B01J 8/00; B01J 8/008; B01J 8/02; B01J 8/04; B01J 8/0446; B01J 8/0449;
(Continued)

(56) References Cited

U.S. PATENT DOCUMENTS 5,202,097 A * 4/1993 Poussin ................ B01J 8/0085
422/218
5,354,898 A 10/1994 Schroeder
(Continued)

FOREIGN PATENT DOCUMENTS

EP 1 297 881 4/2003
FR 2 676 373 11/1992
(Continued)

OTHER PUBLICATIONS

International Search Report for corresponding PCT/FR2019/051612, dated Sep. 9, 2019.
(Continued)

Primary Examiner — Natasha E Young
(74) Attorney, Agent, or Firm — Elwood L. Haynes (57) ABSTRACT A device configured to be interposed between a lower layer and an upper layer of particles arranged inside a cylindrical shell, so as to limit or prevent the migration of particles between the layers.

9 Claims, 6 Drawing Sheets (58) Field of Classification Search
CPC . B01J 8/0453; B01J 19/00; B01J 19/24; B01J 19/30; B01J 19/305; B01J 19/32; B01J 2208/00; B01J 2208/00796; B01J 2208/00884; B01J 2219/00; B01J 2219/24; B01J 2219/30; B01J 2219/302; B01J 2219/30219; B01J 2219/30276; B01J 2219/30288; B01J 2219/32; B01J 2219/322; B01J 2219/32203; B01J 2219/3221

See application file for complete search history.

(56) References Cited

U.S. PATENT DOCUMENTS

| | | | |
|---|---|---|---|
| 7,214,352 B2 * | 5/2007 | Poussin | B01J 8/008 422/218 |
| 7,323,152 B2 | 1/2008 | Axon et al. | |
| 2010/0316540 A1 | 12/2010 | Hamel et al. | |
| 2012/0237415 A1 | 9/2012 | Ramos et al. | |
| 2013/0296610 A1 | 11/2013 | Merkel et al. | |
| 2014/0216379 A1 | 8/2014 | Ratner | |

FOREIGN PATENT DOCUMENTS

| | | |
|---|---|---|
| WO | WO 2004 005187 | 1/2004 |
| WO | WO 2009 103395 | 8/2009 |

OTHER PUBLICATIONS

International Search Report for related PCT/FR2019/051611, dated Sep. 26, 2019.

* cited by examiner

DEVICE MADE OF FABRIC FOR LIMITING OR PREVENTING THE MIGRATION OF PARTICLES BETWEEN TWO LAYERS

CROSS REFERENCE TO RELATED APPLICATIONS

This application is a 371 of International Application No. PCT/FR2019/051612, now WO 2020/012088, filed Jun. 28, 2019, which claims priority to French Patent Application No. 1856372, filed Jul. 11, 2018, the entire contents of which are incorporated herein by reference.

BACKGROUND

The present invention relates to a device intended to be interposed between a lower layer and an upper layer of particles arranged inside a cylindrical shell, so as to limit or prevent the migration of particles between the layers.

This device, situated at the interface between the two particle mediums is porous to any fluids that might be circulating within the shell. It is designed to remain in contact both with the lower and upper layers even in the event of settling of these layers. It can be used in a reactor, an adsorber, or, more generally, in any storage capacity in which there is a desire for various layers of particles to be perfectly separated while at the same time leaving the possibility for a fluid to circulate freely. The cross section of said shell may be any, but will generally be circular, the shell then taking the form of a vertical-axis cylinder.

It is often the case in numerous industrial processes that there is a desire to superpose various layers of particles and prevent any mixing between these layers. The process for producing pure hydrogen using PSA (Pressure Swing Adsorption) is a typical example of this. The adsorbers used in such a process generally take the form of vertical-axis cylinders. From the bottom up, the shell may thus have an inlet/outlet for the circulating fluids (gas to be treated, residual gas, etc.), a support of the grating type for example, various layers of inert particles facilitating correct distribution of the gas across the entire cross section of the adsorber (ceramic beads or any other product of varying shapes and developed for this use), and then, arranged one on top of the other, the various layers of adsorbents chosen to optimize the separation of the hydrogen from the impurities. If the gas that is to be treated originates from a steam reforming process, there might then be, in succession, activated alumina, active carbon and several types of zeolite (5A, 13X, LiLSX . . . ) to successively halt water, secondary impurities, $CO_2$, methane, carbon monoxide and nitrogen. Above the last layer of an adsorbent, there may once again be inert beads intended to reduce the dead volume of the upper dome of the adsorber, to facilitate good distribution of the gas, prevent particles of adsorbent from moving, etc. The various layers there will be have variously differing characteristics. They may thus be differentiated:

- by shape: beads, saddles, sticks, pellets, sheets, granules, crushed material, barrels (perforated pellets), etc.
- by dimensions: from a few centimeters for the supporting elements to less than a millimeter for certain layers of zeolite for example, etc.
- by density: from less than 500 grams per liter for active carbon to several kilograms in the case of steel beads used as inert elements, etc.
- by surface condition ranging from smooth wall (ceramic, certain adsorbents, etc.) to rough wall (active carbon, etc.), or even angular or having roughnesses.

It will be noted that there may be a desire to separate two successive layers of identical products. Certain adsorbents (active carbon, zeolites) may for example be regenerated by the supplier after a first use during which they have become contaminated, generally with moisture. After treatment, they then regain almost all of their initial capacity but as a safety precaution will generally be used as a guard layer underneath one and the same adsorbent in the fresh or uncontaminated state, rather than mixed therewith.

It will be appreciated that, in the case of H2 PSA for example, any mixing of layers would have negative effects on the process. It could lead to local partial blockages resulting in defective distribution of the circulating fluids, to layers of nonuniform thickness, to the presence of an adsorbent in zones in which this adsorbent should not be present (risk of poisoning if it is closer to the feed inlet than intended and is brought into the presence of impurities incompatible with its correct operation, risk of ineffectiveness if, on the other hand, it finds itself in a zone closer to the outlet than intended, this time in the presence of impurities for which it exhibits only a very limited affinity).

As far as possible, a person skilled in the art will use a succession of particulate materials which by nature are unable to mix. The beads that support the adsorbents or catalysts and that distribute the fluids are the best example of this. Suppliers have developed ranges of products the layered successive use of which avoids any possibility of mixing, even at the wall.

There are two important points that should be immediately noted when discussing layers of particulate materials:

- the mutual arrangement of the particles within the one same layer is dependent on how the layer has been filled. The void fraction of the bed thus formed is variable and, for a bed of beads of uniform size, will be able to range, in practice, for example from 0.34 to 0.39, whereas in theory the potential range between the geometrically possible extremes of stacking will be even greater. In the case of bead populations exhibiting a certain spread on the diameter, this void fraction may be lower. Likewise, spread on the sphericity may lead to beds exhibiting greater or lesser amounts of settling. This has a direct impact on the density of the bed which is said to be a dense-packed bed or, in the opposite case, a loose-packed bed. These effects are well known and in particular make it possible to determine, for a given population, the free cross-sectional area through which particles of a smaller size are able to insinuate themselves and, as a result, work their way progressively down through the bed. This approach is more awkward in the case of particles of varying shapes, and tests may be needed in order to determine the void fraction and limit interpenetration.
- The wall creates a discontinuity in the arrangement of the particles of a bed. Because the surface of the wall is generally planar, the local void fraction is different than that within the bed. This void fraction is very generally higher at this point and this has a knock-on effect over a distance of several particles. As before, these effects have been studied and are known to those skilled in the art.

Thus, in order to support an adsorbent bed made up of near-spherical beads (sphericity greater than 0.95), with a mean diameter of 3.0 mm, and fewer than 1% of the beads having a diameter smaller than 2.7 mm, it is possible to place, in succession, on top of the support grid, 10 cm of ceramic beads 20 mm in diameter, then 10 cm of 10-mm beads, and finally 10 cm of 5-mm beads. This will then ensure correct distribution of the circulating fluids and provide support without risk of interpenetration, even at the wall.

This highly-favorable textbook scenario is unfortunately not encountered in industrial applications, and it is often necessary to provide a system for preventing the mixing of two particle populations laid one on top of the other. The need to install such a system may be associated with the respective physical characteristics of the two layers in contact and/or with the usage of the materials.

The physical characteristics include the respective dimensions and densities of the particles of the two layers. It may be necessary for example to use a first layer of adsorbent of relatively large dimension in order to limit pressure drops, followed by a thin layer of small dimension in the frontal zone in order to improve process performance. Upwards of a factor of 2 to 2.5 on the dimensions, there is a risk that the smaller beads will work their way down into the lower layer, particularly near the wall. Another scenario that exhibits risks of mixing is a scenario in which the upper layer is made up of particles of a density higher than those of the lower layer. Because of their greater weight, the particles at the top may locally part the particles of the lower bed and progressively work their way down through this layer as a result of the relative mobility of the materials. There are also events that can lead to a mixing of layers that are apparently stable. These may include knocks or vibrations caused during transport or through the proximity of machinery. The fluids circulating through the various beds may also cause mixing, whether as a result of their high speed or as a result of changes in conditions. These may be events that occur during normal operation (for example each time valves are opened) or accidentally (inopportune opening of a valve, etc.).

It will be noted that in certain cases it is possible to add, in between two successive layers that have been determined as being optimal with respect to the process, an intermediate layer the role of which will be to prevent any migration of particles. This layer may be inert with respect to the process, or merely non-optimal. For example, in a stack comprising a layer of activated alumina 2 mm in diameter normally topped by a layer of zeolite 0.6 mm in diameter, a buffer layer, a few centimeters thick, of zeolite 1.2 mm in diameter, may be interposed between them to avoid the risks of migration. Aside from the slightly unfavorable effect associated with slower kinematics, this complicates the filling by adding a further material that has to be introduced carefully, given the minimal height that is to be installed.

With this as a starting point, one problem that arises is that of providing an improved means for limiting or preventing the migration of particles between at least two layers of different particulate materials.

SUMMARY

A solution of the present invention is a device intended to be interposed between a lower layer and an upper layer of particles arranged inside a cylindrical shell, so as to limit or prevent the migration of particles between the layers, said device comprising a ring of fabric having:
  meshes of equivalent diameter smaller than the equivalent diameter of the particles,
  a length equal to the internal perimeter of the base of the cylindrical shell,
  an upper part having an upper end intended to be attached along its entire length to the internal wall of the cylindrical shell, and
  a lower part comprising at least six identical knife pleats, each pleat being formed by two creased edges that meet at a point, and the pleats being separated from one another in such a way that the lower part is substantially perpendicular to the upper part when the knife pleats are in the folded position.

The "equivalent diameter" of a particle is that of the sphere of the same specific surface area, the specific surface area being the area with respect to the volume of the particle concerned.

The statement that the mesh size of the fabric is smaller than the equivalent diameter of the particles in fact means smaller than the smallest of the equivalent diameters of the particles of the upper and lower layers. In the event of spread of the particle size, it may even be desirable to have a mesh size smaller not than the equivalent diameter but rather smaller than the smallest particles.

The term "fabric" is given a very general meaning here, defining a flexible material made up of filaments and having free passages allowing the circulation of a fluid, and more particularly of a gas. The fabric will preferably be a woven. What is preferably meant here by "woven" is an element obtained by interlacing filaments and having regular openings. The fabric may be woven and obtained by interlacing parallel taut filaments (warp filaments) and filaments running perpendicular to these (weft filaments) using suitable tooling (shuttle, gripper, projectile weaving, etc.). There are a great many possible weaves that can be obtained according to the ways in which the filaments are interlaced and the characteristics of the warp and weft filaments (plain square weave, square crossweave, crossweave, floated weaves, herringbone, etc.).

The fabrics cover a fairly broad field, with filaments the diameter of which may range from the order of one millimeter to several tens of microns, most being comprised between 0.5 mm and 40 microns. The opening (void) is generally comprised between several millimeters and around one hundred microns. The void fraction itself ranges from 20 to 80%, more usually from 30 to 70%.

In the device according to the invention, the material of the ring of fabric will be selected from metals, more particularly stainless steel, polymers, for example nylon, or more generally, textiles (linen, various synthetic materials) etc.

By way of example, the fabric used in the context of the invention may be a fabric made from interlaced stainless steel filaments 0.2 mm in diameter, with openings measuring 0.45 mm by 0.45 mm. Use could be made of filaments of larger diameter by using synthetic materials while retaining equivalent flexibility.

When it is said that the lower part of the ring is "substantially" perpendicular to the vertical axis of the shell-ring, what that means is that the invention applies even if the upper surface of the lower particle layer is not in the form of a perfect horizontal disk. It is known that in spite of the precautions taken at the time of filling, there will be a residual difference in level between the highest point and the lowest point of said layer. With respect to the mean height, this difference in level may be by as much as a few centimeters, for example + or −5 cm in the case of a shell-ring 2 m in diameter. A fabric applied to this surface will therefore make an angle that differs slightly from the theoretical 90°.

Likewise, as regards the pleats, while the plane of creation corresponds to uniformly spaced pleats with creased edges that meet at a point, these pleats may in practice deviate in a few respects from their theoretical definition. What is involved here is differences of a few millimeters, both on the respective dimensions and on their ends, these being down to manufacturing tolerances and the nature of the material (fabric). This has no impact on the principle of the invention.

As indicated below, the choice regarding the number and dimensions of the pleats is dependent on a number of parameters, particularly on the percentage of the total cross section that is to be covered by said ring, on the quality of the contact between the ring and the shell-ring, etc. but six pleats would appear to be the minimum for achieving the desired sealing function under acceptable conditions. In general, as will be explained hereinafter, a higher number of pleats will be adopted.

Through its features, the device according to the invention may be considered as being a floating system. Specifically, what is meant by a "floating system" is a device that remains in contact with the upper and lower layers, even in the event of settling of the beds ("bed" means "layer"), particularly of the lower bed. This settling over the course of time (transport, operation, etc.) will be to a greater or lesser extent depending on the quality of the initial fill with the particles, but generally remains small in extent. It may for example be by the order of 1 to 5 centimeters maximum, for a bed with an initial height of one meter. In addition, this settling generally affects the entire mass of the particulate material, which means that the upper interface of the layer subject to this phenomenon remains approximately horizontal. The device adopted for achieving separation, that accompanies the downward movement of the particles on which it rests, therefore remains in contact with the lower layer, the movement of which it follows, and of course with the upper layer, which is always resting on it and facilitates this contact. One of the benefits of the floating system is that the upper layer of particles applies pressure to the interface with the lower layer, limiting the possibilities for movement of the particles. The risks of attrition are thus reduced and higher flow velocities can generally be used for the circulating fluids. This is often the role of the layer situated right at the top of the shell, for which a material with a high density (ceramic, metal, etc.) is therefore chosen.

What is meant by "comprising knife pleats" is that the fabric which initially takes the form of a strip, has been locally deformed to create a plurality of knife pleats which remain free to open or close according to how this fabric is handled. What is meant by "knife pleats" is pleats formed by two creased edges and which lie flat in the folded, namely closed, position. In the context of the invention, the knife pleats have the particular feature of having two creased edges that meet at a point.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 1A:
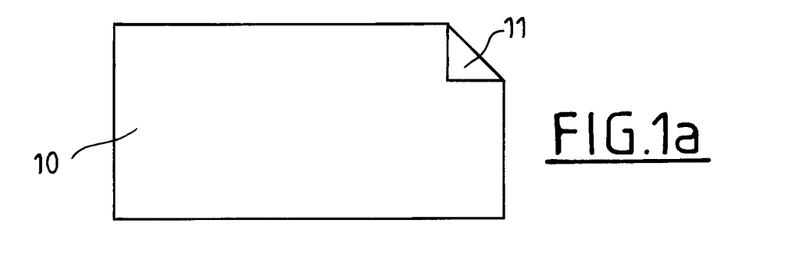
FIG. 1a schematically illustrates one aspect of the pleating, in accordance with one embodiment of the present invention.
Figure 1B:
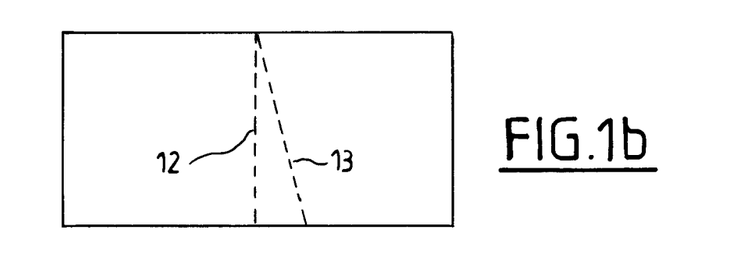
FIG. 1b schematically illustrates one aspect of the pleating, in accordance with one embodiment of the present invention.
Figure 1C:
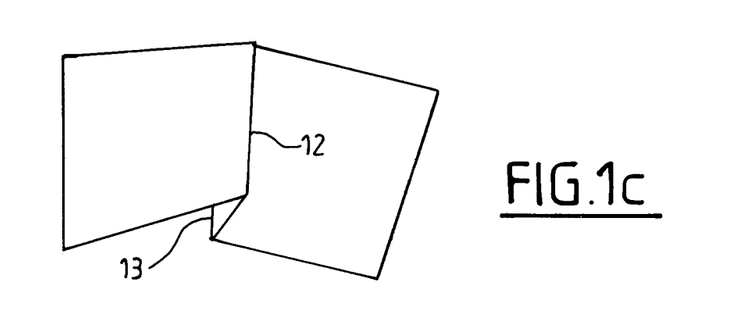
FIG. 1c schematically illustrates one aspect of the pleating, in accordance with one embodiment of the present invention.
Figure 1D:
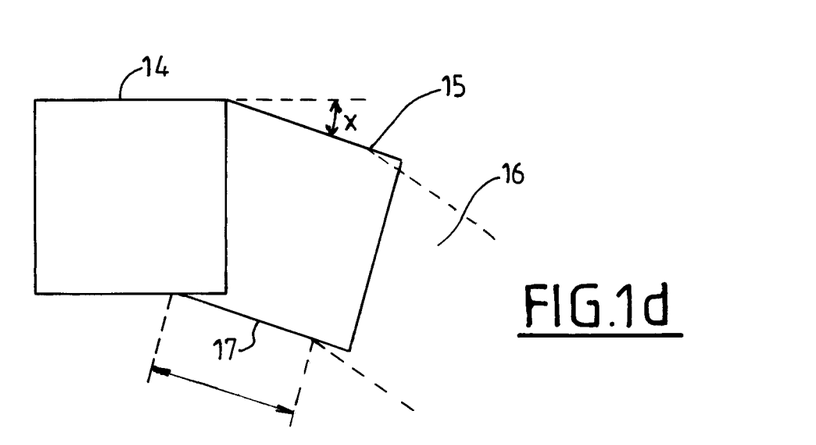
FIG. 1d schematically illustrates one aspect of the pleating, in accordance with one embodiment of the present invention.
Figure 2A:
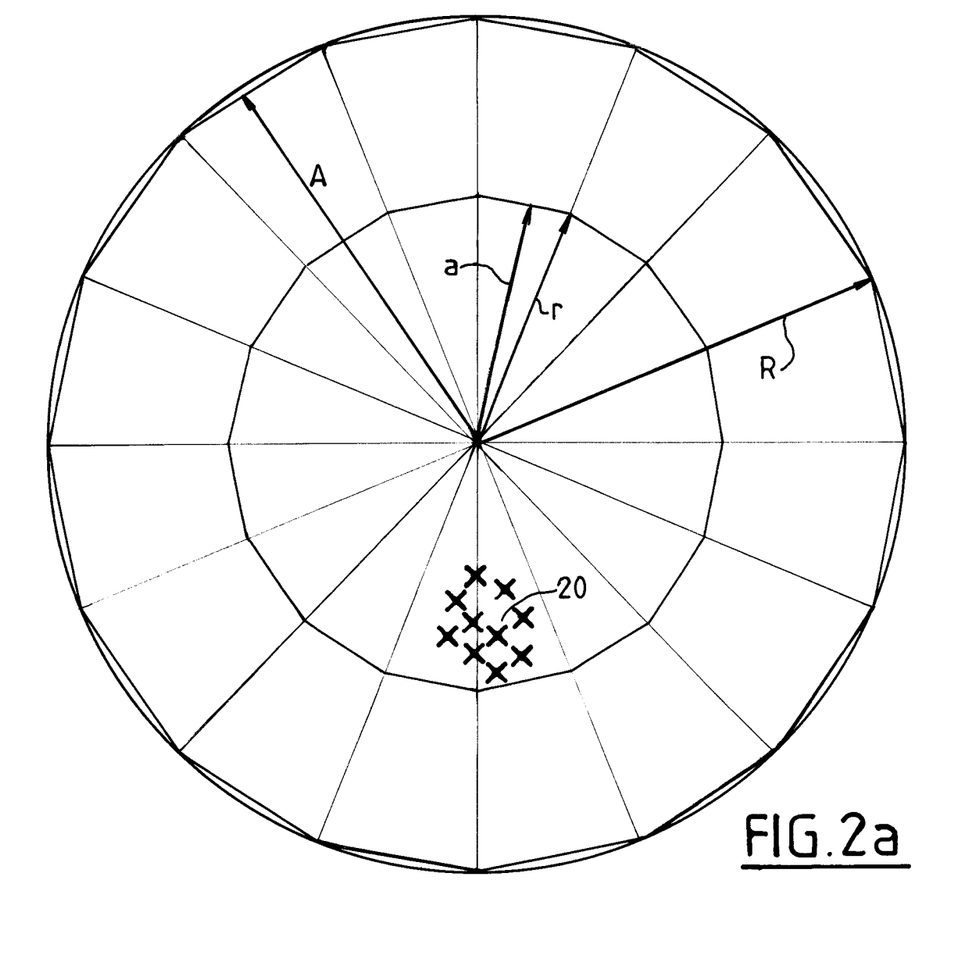
FIG. 2a schematically illustrates a piece of fabric, the folded-over corner making it possible to distinguish the top from the bottom, in accordance with one embodiment of the present invention.
Figure 2B:
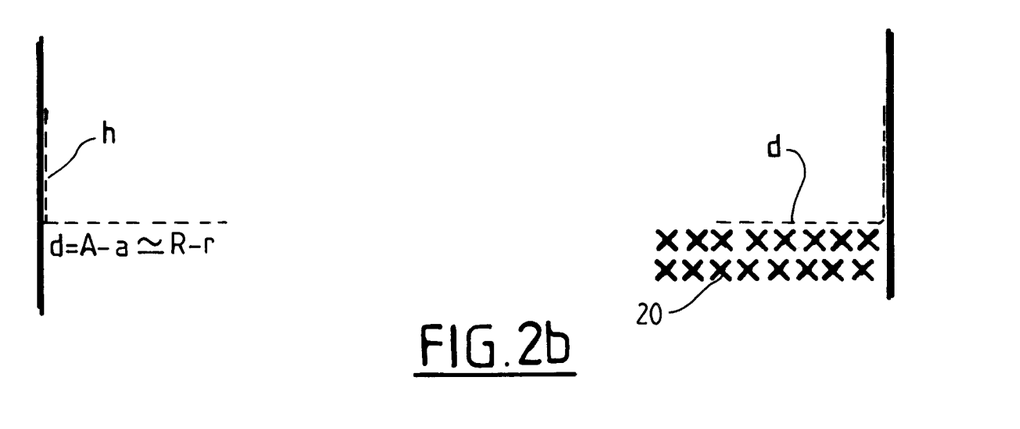
FIG. 2b schematically illustrates the line of the creased edges in the piece of fabric, in accordance with one embodiment of the present invention.

FIG. 2.a is a simple depiction of a piece of fabric 10, the folded-over corner 11 making it possible, using different coloration, to distinguish the top (light) from the underside (shaded). FIG. 2.b shows, in dotted line (12, 13) the line of the creased edges that are to be created. FIG. 2.c is a perspective view of the fabric in which the pleat formed by the 2 creased edges 12 and 13 has been created. The pleat is therefore still partially open. FIG. 2.d corresponds to the same piece of fabric after the knife pleat has been laid down flat, namely folded over completely. In this position, the fabric is considered to be in a folded position. Specifically, in such a device, the maximum thickness of the fabric is approximately 3 times its basic thickness, namely, in the case of the example, of the order of 1.2 mm. There are therefore variations in thickness of the order of a millimeter between various points on the fabric once the latter has been pleated, and this is negligible for example in comparison with the lack of horizontality that may be found at the free surface of a layer of particles whatever the means used to ensure the best possible filling of the shell.

A first important point revealed in FIG. 1 is that the pleating is not irreversible and that it is easy to pass from configuration 1.*a* to configuration 1.*d*, and from configuration 1.*d* to configuration 1.*a*. It may then be said that the pleats are in an unfolded position 1.*a*, or a folded position 1.*d*. This point will be returned to later.

The second important point is that the knife pleat as created, very substantially changes the geometry of the fabric: it means that the orientation of the strip can be changed, by an angle identified as x in FIG. 1.*d*, and the upper length of the device remains the same because the dimensions 14 and 15 correspond exactly to the initial length of the strip, whereas on the other hand the lower length is shortened because of the pleat. It will be appreciated that if pleating were continued in the same way with a longer strip (the additional bit of length 16 indicated in dotted line in FIG. 1.*d*), each unit length of strip 14, 15, 16 will ultimately correspond to a substantially shorter length 17.

This means in practice that it is possible, for a cylindrical shell of given inside diameter, to predetermine the dimensions of a fabric, the number and dimensions of the pleats so that one side of the ring of fabric can be applied along the cylindrical shell and the other side can cover part of the cross section almost in a circle and essentially horizontally without the slightest need to make any cut in the fabric and, as a result, without the slightest risk of mixing of the particles situated below and above.

The device according to the invention makes it possible simultaneously to achieve total sealing, even at the internal wall of the cylindrical shell, permanent contact between the upper layer and the lower layer of particles via said device even in the event of settling of this lower layer, good distribution across the entire cross section of the fluids circulating through the layers, while at the same time being easy and quick to implement.

Depending on the case, the device according to the invention may have one or more of the following features:
- when the knife pleats are in the folded position, the space left at the center of the ring forms a regular polygon, preferably having 8, 10, 12, 14, 16, 18 or 20 sides, and more preferably still, having 12 or 16 sides;
- the knife pleats are separated from one another along the lower part of the ring of fabric by substantially the same distance; as mentioned hereinabove, "substantially" is intended to encompass deviations between the theoretical definition and the practical embodiment of the pleats, which deviations are down to the permissible manufacturing tolerances and possibly due to deformations caused by the flexibility of the material. These deviations represent just a few millimeters or just a few percent of the theoretical dimensions.
- it comprises a sealing disk made of fabric or of mesh with a diameter less than or substantially equal to the inside diameter of the cylindrical shell, the disk and the lower part of the ring of fabric being superposed.

Here again, "substantially" equal is intended to mean that, in order to account for construction tolerances, it may be judicious to adopt a disk diameter slightly greater than the diameter of the shell-ring, for example 10 mm greater for a shell-ring diameter of 1 m.

Another subject of the present invention is a unit comprising:
- a cylindrical shell,
- a lower layer and an upper layer of particles, which layers are superposed in said shell,
- a device according to the invention interposed between the lower layer and the upper layer of particles.

Depending on the case, the unit according to the invention may have one or more of the features below:
- when the knife pleats are in the folded position, the lower part of the ring of fabric covers between 5% and 95% of the surface of the lower layer;
- the unit comprises a device according to the invention, interposed between the lower layer and the upper layer of particles, and the assembly comprising the fabric disk and the lower part of the ring of fabric covers the entirety of the cross section of the cylindrical shell;
- the unit comprises a grid placed on the device according to the invention;
- the particles are selected from adsorbent particles, catalytic particles and inert particles acting as a support, serving to distribute the fluids, or serving to fill dead volumes;
- the unit is a catalytic reactor or an adsorber.

Another subject of the present invention is a method for manufacturing a device according to the invention, comprising the following steps:
a) preparing a strip of fabric having meshes of an equivalent diameter smaller than the equivalent diameter of the particles and a length equal to the internal perimeter of the base of the cylindrical shell
b) forming a ring of fabric from the strip of fabric by joining together the two widths of the strip of fabric,
c) compartmentalizing the ring of fabric into an upper part and a lower part,
d) creating on the lower part at least six identical knife pleats, each pleat being formed by two creased edges that meet at a point, and the pleats being separated from one another in such a way that the lower part is substantially perpendicular to the upper part when the knife pleats are in the folded position.

As a preference, the number of knife pleats will be determined using software by inputting in particular the inside diameter of the cylindrical shell.

A final subject of the present invention is a method for manufacturing a unit according to the invention, comprising the following steps:
a) manufacturing the device according to the invention,
b) attaching the upper end of the upper part of the device obtained in step a) along its entire length to the internal wall of the cylindrical shell,
c) deploying the knife pleats, raising the lower part of the device obtained in step a) and keeping said lower part applied firmly against the internal wall of the cylindrical shell,
d) introducing particles into the cylindrical shell in such a way as to form a lower layer of particles,
e) releasing the lower part of the device obtained in step a) from being kept firmly applied to the internal wall of the cylindrical shell and folding the knife pleats so that the lower part is substantially perpendicular to the upper part, and
f) introducing particles into the cylindrical shell in such a way as to form an upper layer of particles on top of the device obtained in step a).

Depending on the case, the method for manufacturing the unit according to the invention may have one or more of the following features:
- in step c) said lower part is kept firmly applied to the internal wall of the cylindrical shell by means of temporary fixings preferably chosen from magnets and adhesives;
- the method comprises, between steps e) and f), a step of positioning a grid on the device obtained in step a);
- the attaching of the upper end of the upper part of the device obtained in step a) along its entire length to the internal wall of the cylindrical shell is achieved using curved retaining bars. Note that the "retaining bars" may also be referred to as "flat bars". They will preferably be organized in sectors.

the retaining bars are welded, screwed via studs attached to the cylindrical shell and/or bonded to the cylindrical shell.

According to a second alternative, the method for manufacturing the unit according to the invention comprises the following steps:

a) manufacturing the device according to the invention, b) introducing particles into the cylindrical shell in such a way as to form a lower layer of particles, c) attaching the upper part of the device obtained in step a) along its entire length to the internal wall of the cylindrical shell, d) folding the knife pleats so that the lower part of the device is substantially perpendicular to the upper part of the device, and e) introducing particles into the cylindrical shell in such a way as to form an upper layer of particles.

Depending on the case, the method according to this second alternative may have one or more of the following features:

the method comprises, between steps c) and d), a step of positioning a grid on the device obtained in step a);

the attaching of the upper end of the upper part of the device obtained in step a) along its entire length to the internal wall of the cylindrical shell is achieved using retaining bars (also commonly known as flat bars) in the form of pre-bent sectors;

the retaining bars are welded, screwed via studs attached to the cylindrical shell and/or bonded to the cylindrical shell.

the attaching of the upper end of the upper part of the device obtained in step a) is achieved by slipping the fabric over a plurality of studs welded to a circumference of the internal wall of the cylindrical shell and then by applying it firmly to the wall of said shell using retaining bars clamped in place by nuts.

The invention will now be described in more detail using FIGS. 2 to 7.

FIG. 2 shows a device according to the invention in a cylindrical shell of radius R. Discounting any potential overlapping of the fabric, use is made of a rectangular strip of fabric of length $L=2*Pi*R$ and of width $l=h+d$, where h corresponds to the height of fabric firmly applied to the shell-ring and d to the thickness of the sealing ring, namely, with reference to regular polygons, to the difference between the apothems A of the external polygon and a of the internal polygon, $d=A-a$, d also being practically equal to $R-r$, R being the radius of the shell and r the radius of the internal polygon.

The geometry adopted here for the horizontal part of the fabric is that of a regular hexadecagon. That makes it possible, using 16 sectors, to approximate very closely to a circle, the discrepancy between the perimeters being of the order of one percent.

In practice, after having fixed the dimension of the peripheral zone that is to be covered by the fabric (also referred to as the wall-sealing zone or sealing ring), the polygons, for example having 8, 10, 12, 16, 20 sides, that meet this criterion can be selected and then, with all their dimensions being known through simple geometrical calculation, the pleats to be made along one side of the fabric in order to obtain the corresponding geometries can be determined, and the most suitable solution selected.

FIG. 3 depicts views from above of 2 devices according to the invention in place in a shell-ring (cylindrical shell) of the same diameter, and the pleating rules adopted for pleating the strip of fabric in order to arrive at these configurations.

In FIG. 3.a, the thickness of the ring of fabric is of the order of 38% of the radius of the shell-ring, and in FIG. 3.c it represents approximately 75% of this same radius. In both instances, the remainder of the fabric is held firmly against the shell-ring and is therefore normal to the cross section of the shell-ring. This part is indicated by the thick line at the periphery.

Figure 3A:
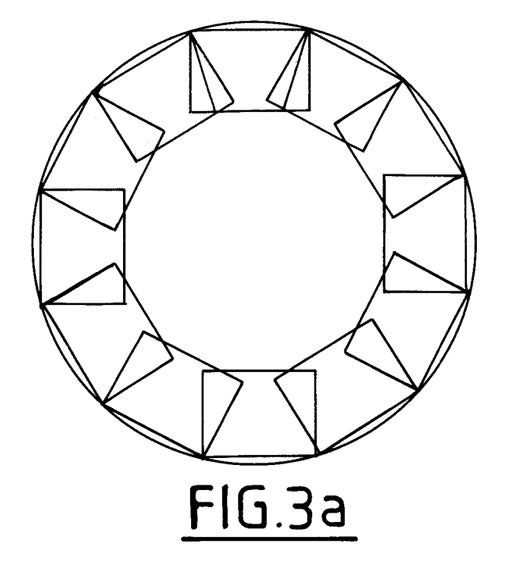
FIG. 3a schematically illustrates the view from above of the invention in place in a shell ring of the same diameter, in accordance with one embodiment of the present invention.
Figure 3B:
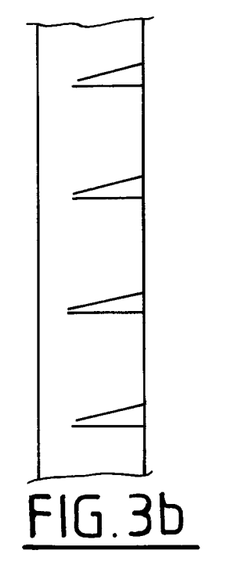
FIG. 3b schematically illustrates the view from above of the invention in place in a shell ring of the same diameter, in accordance with one embodiment of the present invention.
Figure 3C:
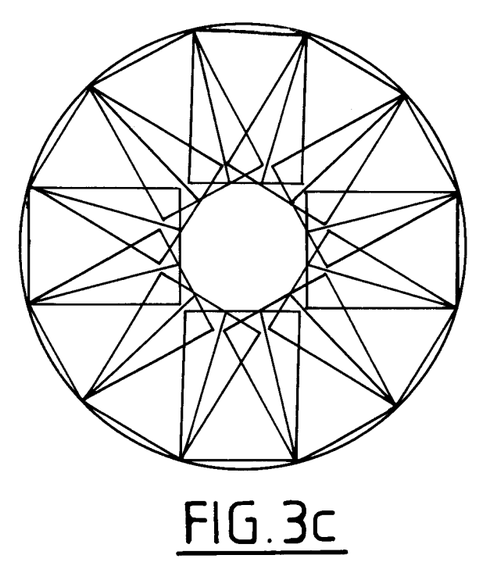
FIG. 3c schematically illustrates the view from above of the invention in place in a shell ring of the same diameter, in accordance with one embodiment of the present invention.
Figure 3D:
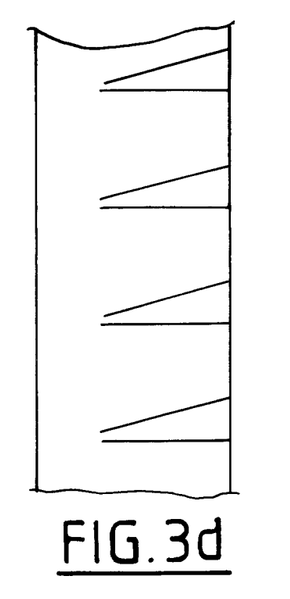
FIG. 3d schematically illustrates the view from above of the invention in place in a shell ring of the same diameter, in accordance with one embodiment of the present invention.

The basic polygon adopted in this case is a regular dodecagon. Once the pleating method has been adopted and the dimensions are known, it is easy to get the characteristics of the strip to be used, and the dimensions and positions of the pleats, calculated and designed automatically It will be noted that the thickness of the sealing ring in FIG. 3.a could be reduced, for example by a factor of 2, if this device is desired merely to form sealing at the periphery. What is meant here by "sealing" is the elimination of migration of particles between the lower and upper layers of particles.

It can be seen from FIG. 3.d that it becomes difficult, on the other hand, to enlarge the sealing ring beyond that depicted. If this were to be taken significantly further, the various pleats would overlap one another, creating difficulties of installation and, because of the multiple thicknesses of fabric that would then be overlapping one another, there would be risks concerning the uniform distribution of the circulating fluids (local restrictions in passage cross section becoming great).

The ring of fabric will therefore not be used by itself where there is a desire to cover the entire cross section of the shell-ring with a means for limiting or preventing the migration of particles. The ring of fabric is designed to cover, measured out from the periphery, just a few percent of the surface area, say 5% up to around 95%. In this case, a sealing disk made of fabric or of mesh will be superposed on the ring of fabric. This small-diameter disk will be able to pass in one piece through the outlet orifice.

However, it should be noted on the other hand that the ring of fabric can be used on its own when the desire is simply to achieve sealing at the periphery. As explained previously, this may be the case for example when the respective size of the particles in the 2 layers in contact with each other is such that there cannot be any mixing away from the edges, but the increase in void fraction at the wall is enough to allow local infiltrations. Vibration may also cause small movements, again at the wall, liable to encourage this type of infiltration.

In a variant, the device according to the invention may therefore comprise a fabric of which the meshes are also smaller than the dimensions of the particles, in the form of a disk of a diameter smaller than, or essentially equal to, that of the cylindrical shell, which disk is positioned on top of or underneath the ring of fabric, the assembly comprising the disk and the ring of fabric then covering the entire cross section of the cylindrical shell.

Figure 4:
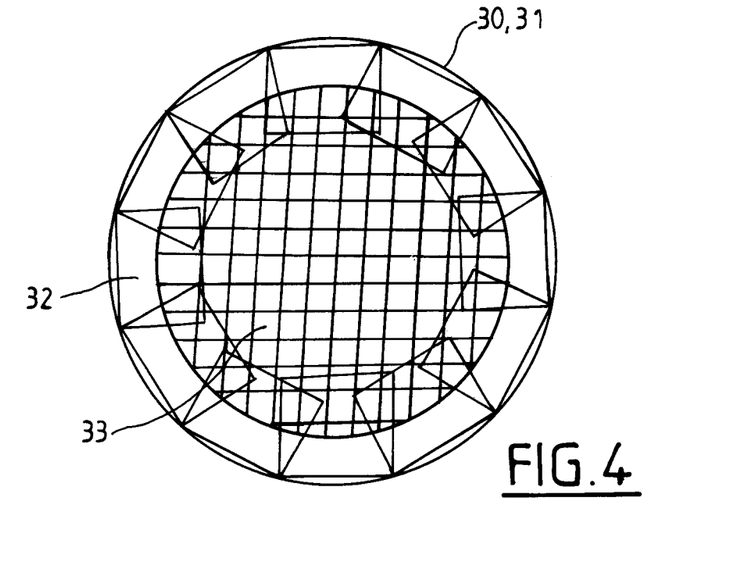
FIG. 4 schematically illustrates an assembly, in accordance with one embodiment of the present invention.
Figure 5A:
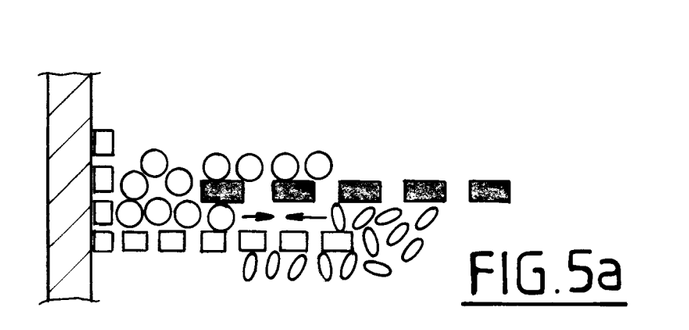
FIG. 5a is a schematic representation in accordance with one embodiment of the present invention.

FIG. 4 depicts such an assembly. The references 30 and 31 represent a cross section of the cylindrical shell and of the upper part of the ring of fabric 32 held firmly against the internal wall of the cylindrical shell. A fabric disk 33 is placed on the sealing ring so that there is an overlap in the assembly comprising the disk and the ring of fabric across the entire cross section of the cylindrical shell. In order to limit any possibility of subsequent shifting of this disk, it may be advantageous to ensure that this disk has a diameter substantially equal to the inside diameter of the cylindrical shell. Determining the overlap between the ring of fabric and the fabric disk is a very important aspect. The purpose of this overlap is to prevent any migration of the particles. With the shell being full, the desire is to prevent particles from the top migrating downward and/or particles from the lower layer migrating toward the upper layer, something which is depicted in FIG. 5.a of FIG. 5. The ring of fabric and the fabric disk have been deliberately spaced away from one another in an exaggerated fashion in order to show the particle pathway that is to be avoided. In practice, because the ring of fabric and the fabric disk rest one upon the other, the possibilities of such migration are greatly reduced, especially since it would require a centrifugal or centripetal force within the layers, something which is somewhat improbable in the majority of applications, and especially at increasing distances away from the edge.

Figure 5B:
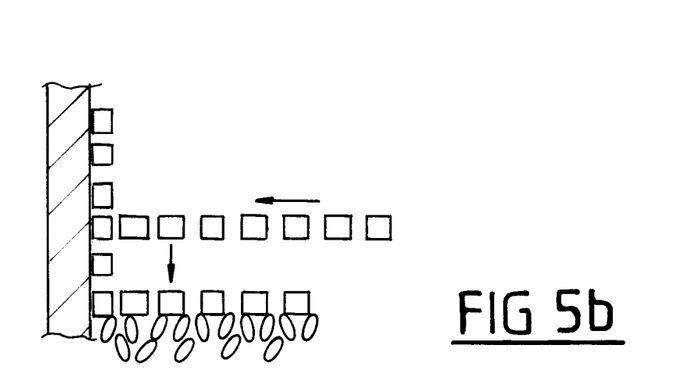
FIG. 5b is a schematic representation in accordance with one embodiment of the present invention.

However, the potential settling of the layers of particles over time also needs to be taken into consideration. It may be seen from FIG. 5.b that the settling of the lower layer will cause the ring of fabric to shift in such a way that the increase in the height of the upper part of the device according to the invention which is held firmly against the wall of the cylindrical shell corresponds to the amount of settling. The movement of the lower part of the ring of fabric will be a movement of centrifugal type, the pleats at the periphery opening to return to the initial dimension of the fabric, namely the dimension of the circumference of the shell-ring. It should be borne in mind that the gas-production or gas-separation processes for which this separation system is intended need to have maximum filling densities in order to perform well, and for charging them with particulate materials (catalysts, adsorbents, etc.) employ suitable methods to allow the particles to rain down and achieve this dense-fill result. The residual settling which may occur is therefore small, of the order for example of 0.5 to 2%. Thus, a layer 2 m thick will generally settle by only 10 to 40 mm. This length should be added to the minimum overlap estimated above. It will be noted that the movement of the fabric of the sealing device will generally be very slow if the unit has filled correctly and operated in accordance with the rules of the art, otherwise it will be necessary to select, for the fabrics of the ring of fabric and of the fabric disk, materials the surface appearance of which allows for such slippage. This generally is the case using standard fabrics. It will also be appreciated that the material of the sealing fabric needs to be flexible enough to be able to fold and then unfold easily.

Note that the unit according to the invention may also have a grid (or grating) resting directly on the device according to the invention.

Figure 6:
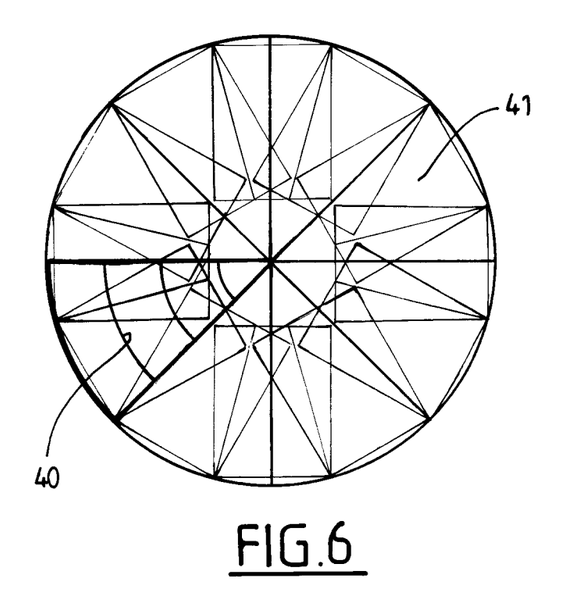
FIG. 6 schematically illustrates a portion of the grating installed in the sections above the device, in accordance with one embodiment of the present invention.

FIG. 6 shows a portion 40 of a grating installed in sections above the device 41 according to the invention. The purpose of this element is to help hold the fabric of the ring of fabric in place and to flatten the pleats. It will be substantially more rigid than the fabric, and heavier, but will preferably have wide openings, as this equipment in itself need not be impervious to the particles. The shape may be any provided that it covers the majority of the surface of the ring of fabric and of the pleats that it comprises. It will be noted that the fabric disk that allowed the entire cross section of the shell to be covered has not been depicted here.

As regards the method for manufacturing the device according to the invention, the preparing step a) will preferably include cutting out the strip of fabric. However, prior to cutting-out, the manufacturing drawing for the device will have been established, preferably using software able automatically to trace the lines of the (essentially rectangular) strip in its flat state, namely in its unfolded configuration, with the location of the pleats, and the figure of the device once pleated, doing this simply on the basis of the internal diameter of the shell-ring, the choice of what regular polygon is to be obtained, preferably a dodecagon or a hexadecagon, and the initial dimension of the ring of fabric.

What is meant by essentially is that the fabric need not be absolutely rectangular in the strict geometrical sense, but may deviate from this ideal geometry a little, by a few percent, whether this be in terms of the dimensions or in terms of the angles. Regarding the length, depending on the method used for attaching the fabric to the shell-ring, it may be appropriate to allow for a few centimeters of overlap at the ends. The pleats marked out beforehand on the fabric are then made using a template and/or suitable tooling. The knife pleats thus produced are not kept fixed down flat in the folded position by any method (bonding, welding, etc.) but are rather left free to move.

According to one particular embodiment, the method for manufacturing the unit according to the invention also comprises a step in which a plurality (N> or =1) of retaining bars, previously bent to the dimensions of the shell-ring, are attached to the non-pleated edge of the fabric. The most commonplace method is to sandwich this edge between two identical bars one on each side of the fabric. In practice, this step allows the fabric to be handled more easily, and makes it easier to install in the shell-ring, while at the same time resulting in a low-volume device that can be introduced into the shell via a small-sized opening such as a fluid-outlet nozzle or a manhole. 4 to 6 retaining bars, which will generally be duplicated in order to achieve the sandwiching described above, provide a good compromise between handling and attaching.

According to another embodiment, a plurality of studs are welded along an entire circumference of the shell-ring, at the intended height at which the ring is to be attached. The number of studs is essentially dependent on the diameter of the shell. These will be uniformly spaced for example by 50 to 200 mm. The ring which then comprises corresponding holes is fitted using these studs as a support. The pre-bent retaining bar sectors are then fitted in the same way and everything clamped in place using nuts. The washers and gaskets needed for sealing form part of the system.

According to a complementary embodiment, the method next comprises
    attaching the upper end of the upper part of the device according to the invention along its entire length to the internal wall of the cylindrical shell, then
    deploying the knife pleats, raising the lower part of the device according to the invention and keeping said lower part applied firmly against the internal wall of the cylindrical shell.

In that way, because the entire fabric is against the wall, the cross section of the shell-ring is essentially free and will allow for very effective filling, the particles raining down, through the use of a suitable filling method, not encountering any obstacle as they fall.

Once the cylindrical shell has been filled to the predetermined level with the particles that form the lower layer, the lower part of the device according to the invention is released from being held firmly against the internal wall of the cylindrical shell and the knife pleats are folded in such a way that the lower part is substantially perpendicular to the upper part.

The filling of the shell can then continue, using the particulate material that sits on top of the layer already introduced, this new material resting directly on the device according to the invention.

As explained previously according to a second alternative, the device according to the invention could be introduced after the first layer of particles has been introduced into the cylindrical shell.

It will be noted that the production method allows for variants which do not alter the actual principle of the invention.

Thus, according to the commonest embodiment, the upper level of the lower layer of particles is situated below the location corresponding to the attaching of the ring to the shell-ring. The upper part of the ring therefore extends downward, from its point of attachment to the level of the layer. However, it is possible to have the upper level of the layer of particles above said attachment point. The part of the ring that is held firmly against the shell-ring is then situated above its attachment point. It is the particles of the lower layer which keep it pressed against the wall. Although the term "upper part of the ring" is then no longer applicable to this form of installation, this term has been maintained for the sake of simplicity, given that it corresponds to the basic scenario. The same goes for the lower part which, regardless of the configuration, refers to the part that comprises the pleats.

It is also possible to create from the outset a pleat in the fabric, going all around the shell, in order to give that part of the ring that is in contact with the wall of the shell-ring some degree of elasticity. That may make it possible to compensate at least in part for the settling of the lower layer without the need for the central part of the fabric to move.

The invention relates more particularly to gas-production or gas-purification processes employing cylindrical shells, these shells being essentially catalytic reactors or adsorbers.

What is meant by adsorbers is devices implementing adsorption methods. A distinction is made between TSA and PSA adsorbers.

The adsorption cycles differ firstly in the way in which the adsorbent is regenerated. If the regeneration is performed essentially by increasing the temperature, then the method is a temperature swing adsorption (TSA) process. If, on the other hand, the regeneration is performed by decreasing the pressure, then the method is a pressure swing adsorption (PSA) process; in general, the term PSA denotes any process for the purification or separation of gas employing a cyclical variation in the pressure which the adsorbent experiences between a high pressure, referred to as adsorption pressure, and a low pressure, referred to as regeneration pressure. Thus, this generic designation of PSA is employed without distinction to denote the following cyclical processes, to which it is also commonplace to give more specific names, depending on the pressure levels employed or the time necessary for an adsorber to return to its starting point (cycle time):

VSA processes, in which the adsorption is carried out substantially at atmospheric pressure, preferably between 0.95 and 1.25 bar abs, and the desorption pressure is lower than atmospheric pressure, typically from 50 to 400 mbar abs;

MPSA or VPSA processes, in which the adsorption is carried out at a high pressure greater than atmospheric pressure, typically between 1.35 and 6 bar abs, and the desorption is carried out at a low pressure lower than atmospheric pressure, generally of between 200 and 650 mbar abs;

PSA processes proper, in which the high pressure is substantially greater than atmospheric pressure, typically between 3 and 50 bar abs, and the low pressure is substantially equal to or greater than atmospheric pressure, generally between 1 and 9 bar abs;

RPSA (Rapid PSA) processes, for which the duration of the pressure cycle is typically less than a minute URPSA (Ultra Rapid PSA) processes, for which the duration of the pressure cycle is of the order of a maximum of a few seconds. It should be noted that these various designations are not standardized and that, in particular, the indicated limits are subject to variation according to the authors. The vast majority of adsorption processes employ several beds of particles, whether these be inert (support, etc.) particles or adsorbents, and there is generally a case for separating at least two successive layers using a suitable system.

More particularly, the invention will be applied to the process for producing oxygen from atmospheric air using pressure swing adsorption comprising a plurality N (N> or =1) of the vertical-axis cylindrical adsorbers employing in each of its adsorbers at least one device according to the invention, this device being situated between an inert support bed and the first adsorbent layer essentially intended to halt the atmospheric moisture (silica gel, activated alumina, type X zeolite, etc.) and/or between two successive layers of adsorbent (for example activated alumina and LiLSX, etc.) and/or between the upper layer of adsorbent and a material used for filling the upper dome (for example between LiLSX and ceramic beads).

The moisture and the $CO_2$ which are contained in the atmospheric air are poisonous to the zeolites used in this application, especially when this zeolite performs well at separating $O_2/N_2$. The charges of adsorbent need to be introduced quickly in order to minimize their contact with the atmosphere. The device according to the invention meets this requirement perfectly.

An adsorber of such a unit will now be described in greater detail with regard to the choice of the materials used, their dimensions and their installation. While the largest oxygen-production units, for example those producing over 100 metric tonnes of $O_2$ per day, use radial adsorbers, medium-sized units, for example producing between 20 and 100 metric tonnes per day, use, instead of a larger single adsorber, small sets of small or medium-sized vertical-axis cylindrical adsorbers operating in parallel. These are then referred to as clusters (or groups), the base element then being referred to as a module. In the case of the example here, the modules used are all identical with a cylindrical shell-ring with an external diameter of 2100 mm, and a height of 1300 mm. The unit considered by way of example is therefore a unit of medium size, of which each adsorber (in the sense of the process of the cycle) is made up of a cluster of 3 modules. The production of oxygen ranges from around 33 to a little over 40 tonnes per day depending on the desired purity (from 90 to 93.5 mol %), and the machines adopted.

We are going to focus on the device according to the invention implemented in one of its modules, and more particularly in the one installed between the lower support layer and the layer of desiccant. The support layer consists of inert beads of relatively large (around 10 mm) diameter so as to create a minimum pressure drop particularly during pumping under vacuum during the regeneration phase. Conversely, the dimensions of the particles of desiccant are small so that the adsorption kinetics are fast enough and suited to the cycle times which are greatly below one minute. The adsorbent is chosen according to the site conditions (pollution, temperature, etc.). In this instance, it is beads of activated alumina 2 mm in diameter. There is therefore the possibility of interpenetration between the two layers and, in particular, the risk is very high at the wall. Sealing at the wall is therefore achieved using the device described and that forms the main subject matter of the invention.

Given the thickness of the shell-ring (10 mm) and the measured interior circumference (6535 mm), in order to ensure that the widths overlap when the two widths of the strip of fabric meet to form a ring of fabric, the length adopted for the length of the strip of fabric is 6600 mm. The width adopted is 500 mm, in the knowledge that around 100 mm of this will correspond to the upper part of the strip which will be applied firmly to the shell-ring and around 400 mm of it will correspond to the lower part of the strip that will have the knife pleats.

The fabric adopted is a woven metal fabric made up of stainless steel filaments 0.2 mm in diameter. The opening adopted is 0.45 by 0.45 mm, which is not only very much smaller than the dimensions of the activated alumina but also avoids any risk of clogging. 12 folds that are uniformly spaced (disregarding the overlapping at the ends) will be made in the lower part of the strip of fabric.

Each elementary fold may be performed using a template in the shape of a set square the base of which has been calculated from the dimensions of the regular polygon that is to be obtained after folding. If we work, to a first approximation, on circumferences, and liken regular polygons to circles, which is accurate to within a few percent, especially if a polygon with numerous sides is chosen, we would need a base of 105 mm for each pleat, so that 210 mm was subtracted for each pleat folded down, so that doing this 12 times would mean subtracting the equivalent of 2520 mm from the length of the strip. A circumference with a remaining length of 4015 mm (6535-2520) corresponds to a circle with a diameter of around 1280 mm, which is what we were looking for. In practice, for the envisioned exact geometry, a more precise calculation gives a base length of 107 mm.

A retaining bar 3 mm thick and 25 mm wide, bent to the dimensions of the shell-ring and cut into 4 identical sectors 1634 mm long is welded to each side of the non-pleated upper part of the strip. The folded ring is inserted into the shell-ring and welded via the retaining bars to a reinforcing strip 3 mm thick and 50 mm wide, itself welded beforehand to the shell-ring at the appropriate height. A sealing weld completes the attachment. During this step, the pleats are deployed and the ring of fabric has the shape of a cylinder conforming to the geometry of the shell-ring.

Figure 7A:
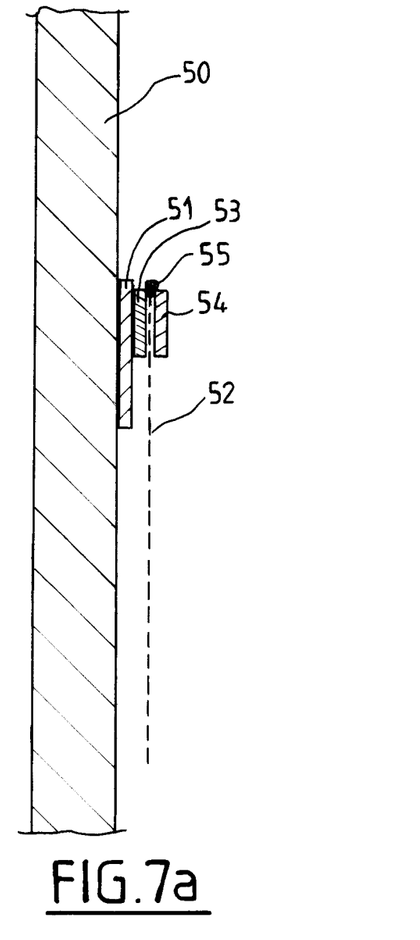
FIG. 7a schematically illustrates a section the ring of fabric, in accordance with one embodiment of the present invention.

FIG. 7.a of FIG. 7 depicts in section the ring of fabric in this position with 50 identifying the shell-ring, 51 identifying the reinforcement welded to the wall of the shell-ring, 52 identifying the fabric, 53 and 54 identifying the bars attached to the fabric, the external bar itself being welded to the reinforcement 51, and 55 identifying the circular sealing weld. All of these steps are performed in the workshop. The filling in the case of the example is also performed in the workshop, and the modules have been transported full. Filling could potentially be performed on site, but that is not the solution adopted here.

Figure 7B:
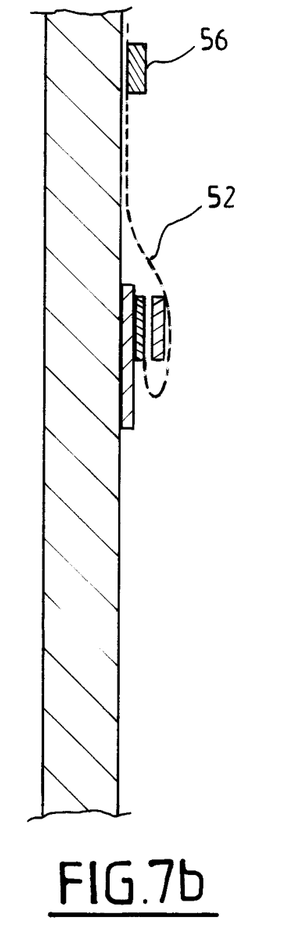
FIG. 7b schematically illustrates a section the ring of fabric, in accordance with one embodiment of the present invention.

Before proceeding with filling, the lower part of the ring 52 is folded against the wall as depicted in FIG. 8.b and held in place by magnets 56 which cling to the carbon steel of the shell-ring. The support beads are introduced up to the intended height. A disk with a diameter of 2000 mm, introduced in the form of a roll, is then installed by unrolling it. The fabric used for the disk is the same as the fabric of the sealing device, namely a woven fabric made from filaments 0.2 mm in diameter with openings measuring 0.45 mm by 0.45 mm. The magnets are then removed and the fabric is deployed at the periphery of the shell-ring, over the disk that has just been installed. In order to keep the pleats properly flat, a choice has been made to install on top of it a grid made of metal filaments 2 mm in diameter with openings measuring 10 mm by 10 mm, previously cut into sections that can fit through the upper opening. Thereafter, all that remains is for the shell-ring to be filled with the activated alumina, continuing with the same procedure.

It should be noted that the features mentioned here in respect of the various pieces of equipment are given solely by way of example and that other materials could be used according to the applications. The main idea is to use a ring of fabric of which one end is attached to the shell-ring whereas part can be folded over toward the inside in a way geometrically devised to be ultimately horizontal without the need to make any cuts at all, thereby obtaining a device that is both perfectly sealed and essentially flat. If the appropriate pleats are not made beforehand, and if the fabric is folded to no precise procedure, what is obtained is some arbitrary surface with several pleats overlapping and the possibility of creating "tunnels" along which particles may travel and pass from one layer into the other.

As already stated above, the scope of the invention is restricted to the cylindrical shells that constitute the vast majority of the shells used in particular in chemical or petrochemical processes. If necessary, this invention could be adapted to suit other geometries by determining a more appropriate folding scheme.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A device configured to be interposed between a lower layer and an upper layer of particles arranged inside a cylindrical shell, so as to limit or prevent the migration of particles between the layers, the device comprising a ring of fabric comprising:
   meshes of equivalent diameter smaller than the equivalent diameter of the particles,
   a length equal to the internal perimeter of the base of the cylindrical shell,
   an upper part having an upper end configured to be attached along its entire length to the internal wall of the cylindrical shell, and
   a lower part comprising at least six identical knife pleats, each pleat being formed by two creased edges that meet at a point, and the pleats being separated from one another in such a way that the lower part is substantially perpendicular to the upper part when the knife pleats are in the folded position.

2. The device as claimed in claim 1, wherein when the knife pleats are in the folded position, the space left at the center of the ring forms a regular polygon.

3. The device as claimed in claim 1, wherein the knife pleats are separated from one another along the lower part of the ring of fabric by substantially the same distance.

4. The device as claimed in claim 1, further comprising a sealing disk made of fabric or of mesh with a diameter less than or substantially equal to the inside diameter of the cylindrical shell, the disk and the lower part of the ring of fabric being superposed.

5. A unit comprising:
   a cylindrical shell,
   a lower layer and an upper layer of particles, which layers are superposed in said shell,
   a device as defined in claim 1 interposed between the lower layer and the upper layer of particles.

6. The unit as claimed in claim 5, wherein when the knife pleats are in the folded position, the lower part of the ring of fabric covers between 5% and 95% of the surface of the lower layer.

7. The unit as claimed in claim 5, wherein the particles are selected from the group consisting of adsorbent particles, catalytic particles and inert particles acting as a support, serving to distribute the fluids, or serving to fill dead volumes.

8. The unit as claimed in claim 5, wherein the unit comprises a catalytic reactor or an adsorber.

9. A method for manufacturing a device as claimed in claim 1, comprising:
   a) preparing a strip of fabric having meshes of an equivalent diameter smaller than the equivalent diameter of the particles and a length equal to the internal perimeter of the base of the cylindrical shell
   b) forming a ring of fabric from the strip of fabric by joining together the two widths of the strip of fabric,
   c) compartmentalizing the ring of fabric into an upper part and a lower part,
   d) creating on the lower part at least six identical knife pleats, each pleat being formed by two creased edges that meet at a point, and the pleats being separated from one another in such a way that the lower part is substantially perpendicular to the upper part when the knife pleats are in the folded position.

* * * * *